Sept. 13, 1966 M. T. GORDON ETAL 3,272,875
SURFACE CRYSTALLIZATION PROCESS
Filed April 26, 1965 2 Sheets-Sheet 1

INVENTORS
MENDEL T. GORDON
GILBERT P. MONET
BY Howard J. Rudge
ATTORNEY

Sept. 13, 1966  M. T. GORDON ETAL  3,272,875
SURFACE CRYSTALLIZATION PROCESS
Filed April 26, 1965  2 Sheets-Sheet 2

INVENTORS
MENDEL T. GORDON
GILBERT P. MONET

BY Howard J. Rudge
ATTORNEY

United States Patent Office 3,272,875
Patented Sept. 13, 1966

3,272,875
SURFACE CRYSTALLIZATION PROCESS
Mendel T. Gordon and Gilbert P. Monet, Wilmington, Del., assignors to E. I. du Pont de Nemours and Company, Wilmington, Del., a corporation of Delaware
Filed Apr. 26, 1965, Ser. No. 450,818
7 Claims. (Cl. 260—646)

The present invention is directed to a novel process for separating a component from a liquid mixture. More particularly, the present invention is directed to a novel surface-crystallization process.

Historically, the components of mixtures of position isomers and chemical homologs have been separated from each other by such methods as fractional distillation and fractional crystallization. However, in order to obtain a pure product by either method, several stages are usually required. One of these methods, fractional crystallization, accomplishes the separation of closely related components by using the differences in solubility of the components in the melt mixture at specific temperatures. The melt liquor which is at a temperature where all the components are soluble in the melt, is gradually lowered until a temperature is reached where crystals of the least soluble component are formed. Thereafter, the solid crystals of the least soluble component are separated from the melt liquor which is rich in the more soluble components.

There are two types of fractional crystallization, namely, suspension crystallization and surface crystallization. In suspension crystallization, the crystals of the least soluble component are formed suspended in the mother liquor and subsequently filtered from the mother liquor in order to accomplish separation. In surface crystallization, the crystals of the least soluble component form or nucleate on a cooled surface and the mother liquor drained away to accomplish separation. The present invention is directed to this latter technique known as surface crystallization.

On a commercial scale, surface crystallization or sweating is utilized for various separations such as the separation of position isomers, homologs, and waxes from oils. However, present methods of surface crystallization are quite inefficient with respect to the degree of purification and yield of product per area of cooling surface. The present-day surface crystallization processes are carried out in "sweat pans" or fractional crystallizers. These "sweat pans" usually consist of large boxes (up to 2500 cubic feet in volume) containing a large number of water or brine cooled vertical plates spaced at convenient intervals, usually from 4 to 6 inches.

Separation of organic components in the "sweat pan" is started by filling the pan with a molten crude mixture of the components. The temperature of the cooling medium circulating in the plates is decreased at a chosen rate causing crystals of the least soluble component to be deposited on the surface of the cooling plates. This is continued until the lowest economical or eutectic temperature of the mixture is reached. At this point the remaining liquid is drained away leaving the crystal deposits on the cooling plates. Since it is difficult to control the rate of crystal growth by this type of apparatus, dendritic crystals of less than desired purity usually form. The low purity of dendritic crystal formation results from the fact that melt liquid is usually trapped in the interstices of crystals during their rapid growth. In order to eliminate these impurities, it is common practice, after the molten liquid is drained away, to raise the temperature of the plates slowly to within a few degrees of the product freezing point in order to "sweat" the impurities from the crystal deposits. These "sweatings" are also drained away. After the sweatings are drained away, the plate temperature is raised above the product freezing point in order to melt the product from the plates. The product is drained from the pans enabling the pans to receive the next charge of molten crude mixture. The over-all rates of productivity in the sweating process are usually of the order of 0.10 to 0.15 lb. product/hr. per square foot of cooling surface.

Although a certain degree of control of deposited crystal purity is obtainable by the regulation of the rate of melt or solution cooling, several stages of sweating purification may still be required before an acceptable purity is obtained.

It is, therefore, an object of the present invention to provide a novel process for separating components in a liquid mixture in a single-stage operation.

It is another object of the present invention to provide a novel, single-stage surface fractional crystallization method which provides a product of unusual purity.

It is a still further object of the present invention to provide a novel, single-stage surface fractional crystallization method which provides a high rate of productivity per area of cooling surface.

These and other objects will become apparent from the following description and claims.

More specifically, the present invention is directed to a surface crystallization process for separating a component from a liquid mixture which comprises depositing a dense, glass-like crystal layer of said component on a cooled surface at a controlled rate by maintaining a constant concentration gradient at the mother liquor-crystal interface. This controlled rate of crystal growth on the cooled surface is accomplished by simultaneously and continuously controlling the rate of flow of mother liquor over the cooling surfaces and the temperatures of both the coolant fluid and mother liquor. It is most preferred to control the rate of flow of the mother liquor and the temperatures of the coolant and mother liquor so as to maintain the temperature at the mother liquor-crystal surface above the nucleation temperature, but at a temperature below the freezing point of the liquid mixture to cause crystal growth.

The kinetics of a crystallization process can be described by the following heat and mass transfer balances. The heat balance at the mother liquor-crystal interface is $$hA(T_m - T_i) + A\lambda\rho\frac{dx}{d\theta} = \frac{A'k}{x}(T_i - T_w)$$

wherein by mass transfer balance at the interface $$\frac{dx}{d\theta} = \frac{K}{\rho}(C^* - C_i)$$

In these relationships, $h$ is the interfacial film heat transfer coefficient measured in B.t.u./hr.×ft.²×° F., $A$ is the area of the mother liquor-crystal interface measured in square feet, $A'$ is the mean area for heat transfer through the crystal measured in square feet, $\lambda$ is the heat of fusion measured in B.t.u./lb., $\rho$ is the crystal density in lbs./ft.³, $k$ is the crystal thermal conductivity measured in B.t.u./hr.×ft.²×° F./ft.

K is the crystal growth rate constant measured in lbs./hr.×ft.²×mol fraction $T_m$ is the melt temperature (° F.), $T_w$ is the coolant temperature (° F.), $T_i$ is the mothed liquor-crystal interface temperature (° F.), $C^*$ is the melt composition measured in mol fraction, $C_i$ is the interfacial composition in equilibrium with the interfacial temperature ($T_i$) measured in mol fraction, $x$ is the crystal thickness in ft., and $\theta$ is the time in hours.

The present invention comprises a means for providing maximum crystal growth rate commensurate with a given degree of crystal purity by a process which provides ice-like crystal growth. This ice-like crystal growth is accomplished by carrying out the crystallization with a controlled constant concentration gradient at the mother liquor-crystal interface.

A better understanding of the present invention will be obtained by reference to the accompanying drawings, which form a part of this application.

FIGURE 1 is a schematic illustration of a possible arrangement of apparatus, flow paths, and instrumentation which may be used in practicing the novel process of this invention. It is to be understood, of course, that this arrangement of apparatus is merely illustrative and represents only one of several arrangements which a skilled art worker could use to practice the novel process outlined above.

Figure 1:
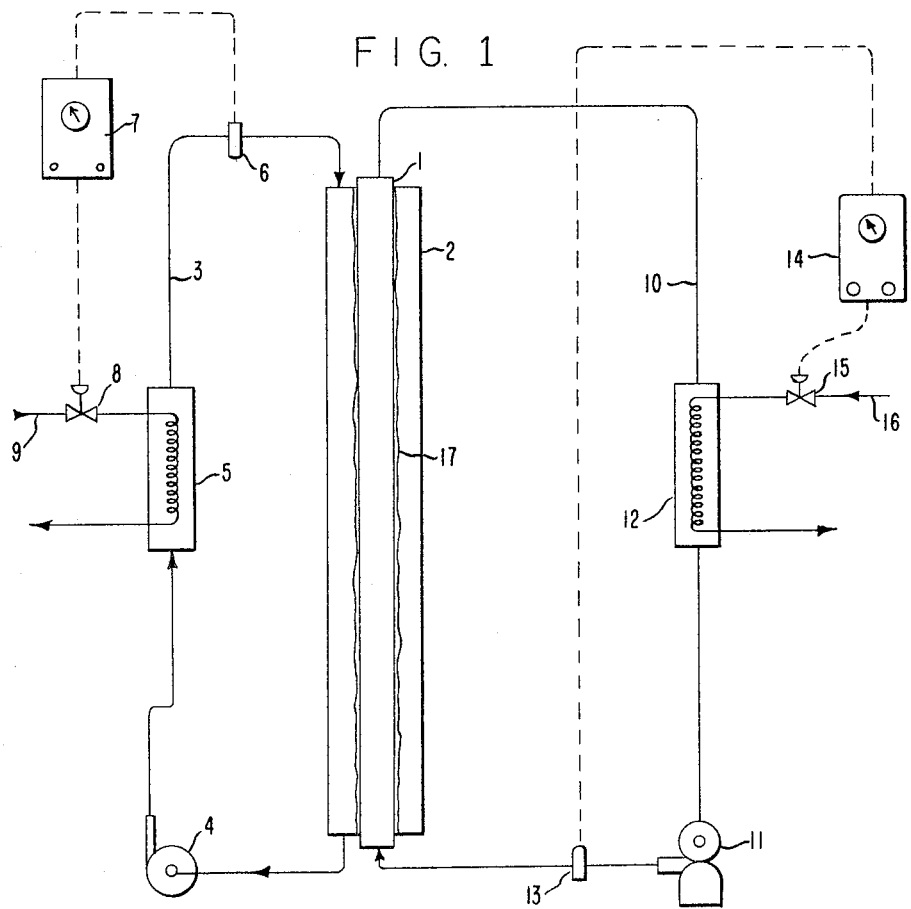

In the surface crystallization unit of FIGURE 1, the crystallizer cooling surface tube 1 is enclosed in a casing or shell 2. Melt or mother liquor is circulated in fluid loop 3 which consists of a melt circulation pump 4, a melt heat exchanger 5 and a temperature sensing element 6. The flow rate of the melt is controlled or varied by the settings on pump 4. The temperature of the melt stream entering the crystallizer shell 2 is measured by the sensing element 6 and signal representing this temperature is sent to a temperature controller 7. Since the rate at which the temperature of the melt is lowered has been previously calculated according to the process of this invention, the controller 7 can be pre-programmed so that it will maintain a controlled temperature decrease over a specified period of time. If the signal from the sensing element indicates that the temperature of the melt is either above or below this programmed temperature range, the controller 7 makes an appropriate correction by regulating valve 8 which controls the amount of heating fluid flowing in the heating system 9. In the crystallizer tube 1 flows the cooling fluid. The coolant circulating loop 10 consists of a coolant circulating pump 11, a heat exchanger 12, and a temperature sensing element 13. Since the rate at which the temperature of the coolant is lowered has also been pre-programmed according to the process of this invention, the controller 14 can also maintain a controlled temperature decrease over a specified crystallization period. If the signal from the sensing element 13 indicates that the temperature of the coolant flowing into the crystallizer tube is either above or below this programmed temperature range, the controller 14 makes an appropriate correction by regulating valve 15 which controls the amount of cooling fluid flowing in the coolant system 16. During the process a crystal layer 17 will deposit on the crystallizer tube 1. The development of this crystal layer will be more fully developed in reference to FIGURE 3.

In the present novel surface crystallization method, the particular structural configuration of the cooling surface affects to a degree the productivity of the process. As heretofore discussed, the rate at which the melt flows over the cooled surface is one of the factors which controls the concentration gradient at the mother liquor-crystal interface. It is known that a high degree of separation at a high rate of productivity can be accomplished if a uniform melt velocity is maintained across the cooling surface. In order to maintain this uniform melt velocity, the configuration of the cooling surface is quite important.

It is, therefore, preferred that the cooling surface used in the present process consist of the outer walls of a hollow tube or multiplicity of hollow tubes. It is even more preferred that the hollow tube or multiplicity of hollow tubes each have multiple fins attached to their outside surface to increase the cooling surface, said fins running parallel to the longitudinal axis of the tubes in planes which are essentially the radial planes of the hollow tubes.

Figure 2:
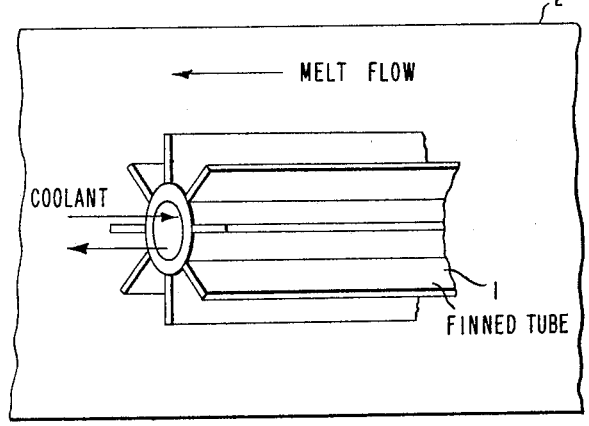
FIGURE 2 is a schematic drawing of a finned tube of the type which is uniquely utilized in the novel process of the present invention.

FIGURE 2 is a schematic drawing of the type of finned tube which gives the highest productivity rate and is the preferred type of cooling surface in the present invention. It can be appreciated that a minimum of eddying currents or other disturbances which affect the velocity of the melt passing the cooling surface will result when the melt flows in the direction of the longitudinal axis of the finned tube. As designated in FIGURE 2, the coolant flowing in the hollow finned tube 1 can flow in either direction, i.e., in the same direction or in the opposite direction to the flow of the melt in the shell around the finned tube.

Figure 3:
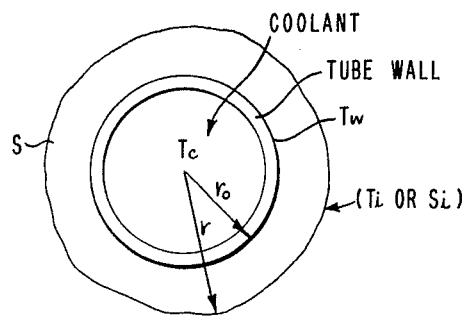
FIGURE 3 is a schematic drawing of a cross-sectional view of a hollow tube used as a cooling surface in the novel process of the present invention.
Figure 4:
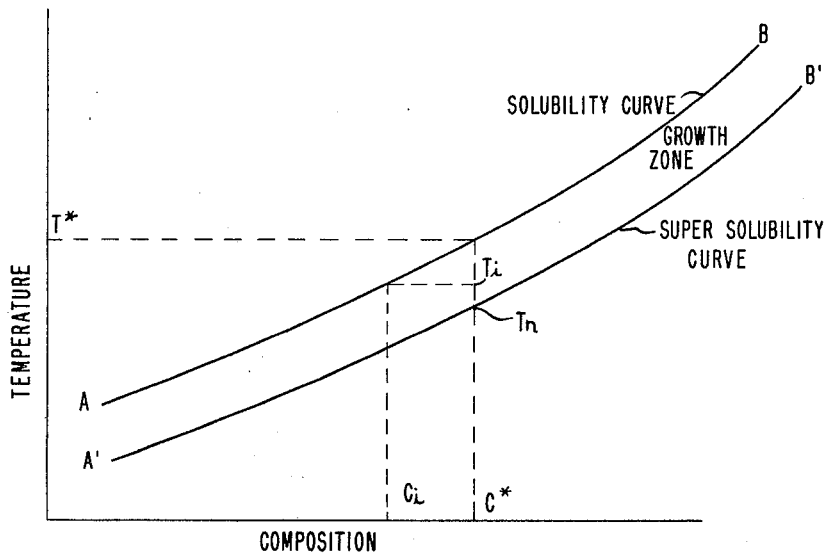
FIGURE 4 is a chart showing the growth zone of crystals in relation to the composition and temperature of the melt and crystal deposit.

The general mechanism involved in the present crystallization process is better understood with reference to FIGURES 3 and 4. Consider, for example, a crystal beginning to form in a melt of composition $C^*$ as shown in FIGURE 4. The melt solution at the beginning of crystallization has a melting point $T^*$ associated with $C^*$ as shown by the solubility curve A–B in FIGURE 4. In order for the crystal to grow, $T_i$ (crystal-liquid interface temperature) must be less than $T^*$. Exactly how much lower the temperature $T_i$ is from the melt temperature $T^*$ determines, with reference to the solubility curve A–B, the actual concentration gradient ($C^*-C_i$) or driving force of the crystallization process. The temperature difference ($T^*-T_i$) is termed the degree of supercooling. In order to get the interfacial temperature ($T_i$) below the melt temperature ($T_m$), heat must be transferred from the crystal. However, there is a temperature where the rate of formation of new nuclei will suddenly become high and many new small crystals will form at the expense of the growth of existing crystals. This temperature is usually defined as a temperature below $T_n$, a temperature on the supersolubility curve designated as line A′–B′ in FIGURE 4. This rapid formation of new nuclei is naturally undesirable where the growth of dense, glass-like crystals of high purity is desired. Therefore, A′–B′ represents a lower limit to operability of a crystal growth situation. To maintain a maximum rate of growth of existing crystals, the melt temperature should be held just above the solubility curve A–B. In addition, to make the crystal growth driving force ($T^*-T_i$), i.e., ($C^*-C_i$), as large as possible, $T_i$ should be as low as possible with a lower limit being the supersolubility curve A′–B′.

From the above, the following relationship of temperatures can be established to obtain optimum surface crystallization. This temperature relationship is:

$$T_n < T_i < T^* < T_m \text{ or } T_n < T_i < T_m < T^*$$

If the temperatures of the melt and coolant and the floor rate of the melt are controlled to give this relationship between the temperatures, then dense, glass-like growth of crystals can be obtained in a crystallization process.

The controlled programming of melt temperature, melt flow rate, and coolant temperature is best illustrated by the following procedure.

Consider a system whereby it is wished to program melt and coolant temperature cycles (keeping flow rates constant) to maintain a constant crystallization rate on the outside of a ¾-inch O.D. steel tube such as that of FIGURE 3. In FIGURE 3, $r_0$ is the tube radius in feet and $r$ is the tube radius plus crystal thickness in feet. In such cases where crystals grow attached to a source of cooling, such as the steel tube of FIGURE 3, as the crystal, S, grows in thickness it becomes an increasing resistance to the flow of heat from the crystal-melt interface $S_i$, to the wall carrying the coolant fluid, $T_w$. This resistance must be compensated for by increasing the total driving force $(T_i-T_w)$ across the crystal. This can be accomplished by decreasing the coolant temperature and consequently the wall temperature $T_w$ (assuming negligible heat flow resistance through the wall).

In order to program any system without the aid of a computer, various assumptions must be made to simplify the mathematics involved. These assumptions, however, will not cause significant error in the programming. The assumption that the wall of the cooling tube has negligible heat resistance considering the heat resistance of the crystal has already been mentioned. Another assumption which must be made is that the temperature gradient within the crystal layer is linear. Another assumption is that within the region of interest the concentration of the least soluble component in the melt composition decreases in a straight-line relationship as the melt temperature is lowered. In other words, over the region of interest used in developing the following relationships, the solubility curve was assumed to be a straight line, although it was realized that this was not entirely correct. Finally, it must also be assumed that over the region of interest the amount of the least soluble component crystallized from the melt is so small that the melt composition does not change significantly.

Having made the above assumptions to simplify the mathematics, the heat flow across the crystal layer for the tubular crystallizer is formulated as follows:

Heat arriving at the interface per unit length from the melt is mathematically represented by the function $2\pi r h(T_m-T_i)$ wherein $2\pi r$ is the circumference of the crystal deposit on the tube in feet, $h$ is the interfacial film heat transfer coefficient expressed in B.t.u./hr.$\times$ft.$^2\times$° F., $(T_m-T_i)$ is the temperature difference in ° F. between the melt and interface.

The heat generated at the interface per unit length by crystallization is mathematically represented by the function $$2\pi r \lambda \rho \frac{dr}{d\theta}$$

wherein $2\pi r$ is the circumference of the crystal deposits on the tube in ft., $\lambda$ is the heat of fusion, B.t.u./lb., $\rho$ is crystal density in lb./ft.$^3$, and $dr/d\theta$ is the rate at which the crystal deposit is formed per unit of time.

The heat carried away from the interface per unit length can be represented by the function $$\frac{2\pi k(r-r_0)}{\left(r-r_0 \ln \frac{r}{r_0}\right)}(T_i-T_w)$$

where $k=$crystal thermal conductivity in B.t.u./hr.$\times$ft.$^2\times$° F./ft., and $(T_i-T_w)$ is the temperature difference in ° F. between the interface and coolant.

Setting up a heat balance at the interface the following relationship is derived:

$$2\pi r h(T_m-T_i)+2\pi r \lambda \rho \frac{dr}{d\theta}=\frac{2\pi k(r-r_0)}{(r-r_0)\ln\frac{r}{r_0}}(T_i-T_w)$$

Multiplying this relationship by $r_0/2\pi r$ gives:

$$r_0 h(T_m-T_i)+r_0 \lambda \rho \frac{dr}{d\theta}=\frac{k}{\frac{r}{r_0}\ln\frac{r}{r_0}}(T_i-T_w)$$

The mass transfer relationship at the interface is expressed as a function of concentration gradient as follows:

$$\frac{dm}{d\theta}=K(T^*-T_i)$$

or $$\frac{dr}{d\theta}=\frac{K}{\rho}(T^*-T_i)$$

where $m$ is the weight of crystals formed per hour per unit interfacial area, $(T^*-T_i)$ is a function of the concentration gradient, $K$ is the crystal growth rate constant expressed in lb./hour$\times$ft.$^2\times$° C., and $\rho$ is crystal density in lb./ft.$^3$.

Now using the above relationships to program the crystallization of 3,4-dichloronitrobenzene from a melt containing 86% of the 3,4 isomer and 14% of the 2,3 isomer, the following physical parameters in the above function were experimentally determined.

$\rho=102$ lb./ft.$^3$, $k=0.11$ B.t.u./hr.$\times$ft.$\times$° F.,
$T^*=33.5$° C., $\lambda=36.4$ B.t.u./lb.

In addition, standard laboratory methods have shown that under the approximate conditions of processing, where the melt velocity is constant at a rate of from 1 to 2 feet/second, the following parameters can be established:

$$h=50 \frac{\text{B.t.u.}}{\text{hr.}\times\text{ft.}^2\times°\text{F.}}$$

$$K=2.0 \frac{\text{lb.}}{\text{hr.}\times\text{ft.}^2\times°\text{C.}}$$

Laboratory work must be conducted to establish an optimum rate of crystal growth for a given system. This rate may be considered as the maximum rate at which the smooth crystal growth can be achieved. This can be done by observation of the crystal masses resulting from simple crystallization under controlled cooling.

Table I is now set up and an initial value for $T_w$ is chosen. This value is usually dictated by refrigeration limitations. In this example, $T_w$ was selected to start at 32° C. Now since the term $(r/r_0 \ln r/r_0)$ is zero at the start of crystal laydown, an initial value of $r/r_0=1.01$ is selected for a starting point. A crystal growth rate, $dr/d\theta$, of 0.015 ft./hr. was found, in the laboratory, to give an optimum balance with crystal purity.

Then since $$\Delta\theta=\frac{r_0}{.015}\Delta\left[\frac{r}{r_0}\right] \text{ and } \theta=\Sigma\Delta\theta$$

values of $\theta$ were tabulated in the elapsed time column, Table I. The initial rate of change of $T_w$ is chosen to be 30° C./hr. until 7.6° C. (the limiting temperature of the refrigerant) is reached. For the sake of convenience of calculation this rate is held constant although any coolant temperature change as a function of time may be selected which results in a melt-crystal interfacial temperature, $T_i$, above the nucleation temperature and economic cooling loads. The theoretical cooling load is expressed by the term $$\frac{A^1 k}{x}(T_i-T_w)$$

A trial and error solution of the problem may be necessary to establish $T_i$ close to the nucleation temperature. $T_i$ is then calculated using the mass transfer balance and the columns are thus systematically developed.

TABLE I.—PROGRAMMING MELT AND COOLANT TEMPERATURES FOR THE SEPARATION OF 3,4-DICHLORONITROBENZENE FROM POSITION ISOMERS BY SURFACE CRYSTALLIZATION

| $r/r_o$ | $\theta$ | $T_w$ [a] | $T_i$ [b] | $T_w - T_i$ | $\dfrac{r}{r_o}\ln(r/r_o)$ | $\dfrac{k}{\dfrac{r}{r_o}\ln(r/r_o)}(T_i - T_w)$ [c] | $r_o\lambda\rho\left(\dfrac{dr}{d\theta}\right)$ [d] | $r_o h(T_m - T_i)$ [e] | $T_m - T_i$ | $T_m$ [f] |
|---|---|---|---|---|---|---|---|---|---|---|
| 1.0 | 0 | 32.6 | 32.7 | -------- | 0 | -------------- | .96 | -------------- | -------- | -------- |
| 1.01 | 0.0208 | 32.0 | 32.7 | .7 | 0.0106 | 7.25 | .96 | 6.29 | 4.0 | 36.7 |
| 1.1 | 0.208 | 26.3 | 32.7 | 6.4 | 0.105 | 6.70 | .96 | 5.74 | 3.7 | 36.4 |
| 1.2 | 0.416 | 20.1 | 32.7 | 12.6 | 0.219 | 6.32 | .96 | 5.36 | 3.4 | 36.1 |
| 1.3 | 0.624 | 13.8 | 32.7 | 18.9 | 0.341 | 6.10 | .96 | 5.14 | 3.3 | 36.0 |
| 1.4 | 0.832 | 7.6 | 32.7 | 25.1 | 0.471 | 5.87 | .96 | 4.91 | 3.1 | 35.8 |
| 1.5 | 1.040 | 7.6 | 32.7 | 25.1 | 0.608 | 4.55 | .96 | 3.59 | 2.3 | 35.0 |
| 1.6 | 1.248 | 7.6 | 32.7 | 25.1 | 0.752 | 3.66 | .96 | 2.20 | 1.7 | 34.4 |
| 1.7 | 1.456 | 7.6 | 32.7 | 25.1 | 0.902 | 3.05 | .96 | 2.09 | 1.3 | 34.0 |
| 1.8 | 1.664 | 7.6 | 32.7 | 25.1 | 1.059 | 2.61 | .96 | 1.65 | 1.1 | 33.8 |
| 1.9 | 1.872 | 7.6 | 32.7 | 25.1 | 1.220 | 2.26 | .96 | 1.30 | 0.8 | 33.5 |
| 2.0 | 2.080 | 7.6 | 32.7 | 25.1 | 1.387 | 1.99 | .96 | 1.03 | 0.7 | 33.4 |
| 2.1 | 2.288 | 7.6 | 32.7 | 25.1 | 1.559 | 1.78 | .96 | 0.82 | 0.5 | 33.2 |
| 2.2 | 2.496 | 7.6 | 32.7 | 25.1 | 1.735 | 1.60 | .96 | 0.64 | 0.4 | 33.1 |
| 2.3 | 2.704 | 7.6 | 32.7 | 25.1 | 1.915 | 1.44 | .96 | 0.48 | 0.3 | 33.0 |

[a] Programmed coolant temperature.
[b] Picked arbitrarily or as shown acceptable by experimentation using the relationship $T_i = T^* - \dfrac{\rho}{K}\dfrac{dr}{d\theta}$
[c] Represents heat load—total heat removed per hour per foot of tube.
[d] Represents heat coming from crystallization.
[e] Represents heat coming from melt.
[f] Programmed melt temperature.

Column $T_m$ gives the desired melt temperature program. An analog or digital computer can be used by one skilled in the art for the more difficult cases where the above assumptions are not made and the effect of changing melt compositions, nonlinear gradients within the crystal and changing melt velocity are considered in programming melt flow rate, melt temperature and coolant temperature to give glass-like crystal growth.

Representative examples of the present invention are as follows. All parts are by weight unless otherwise specified.

*Example 1*

A surface crystallization unit consisting of three ¾-inch O.D. 8-ft. long tubes each with sixteen ½-inch high x 8-ft. long longitudinal fins, all mounted inside a 4-inch diameter glass pipe, was used for the following fractional crystallization:

Feed composition: 85.9% 3,4-dichloronitrobenzene; 14.1% 2,3-dichloronitrobenzene.

The melt and coolant temperature cycles were programmed in a manner similar to that heretofore described using a melt velocity of 1 ft./second and a crystal deposition rate of 0.04 ft./hr. The following results were realized:

Wt. of unsweated product, lbs. _____ 31.9
Purity of unsweated product, percent _____ 92.0
Wt. of sweated product, lbs. _____ 28.5
Purity of sweated product, percent _____ 94.0

Over-all production rate:

$$\dfrac{1.9 \text{ lbs. product}}{\text{hr.} \times \text{ft.}^2 \text{ tube surface}}$$

Yield:

$$0.90 \dfrac{\text{lb. product}}{\text{lb. crystals}}$$

The crystal layer which formed on the heat transfer surface was ice-like and smooth with no observed dendritic structure and thus had little entrapped melt.

While there was little entrapped melt, there was a layer of melt adhering to the surface of the deposit. Since this was a surface impurity, it was relatively easy to obtain a 94% pure crystal after a short sweating period as evidenced by the high over-all production rate and product/crystal ratio. At a sacrifice of productivity, an extended sweating period would give a substantially pure product.

*Example 2*

The equipment of Example 1 was used for the following fractional crystallization:

Feed composition: 93% 3,4-dichloronitrobenzene; 7% 2,3-dichloronitrobenzene.

The melt and coolant temperature cycles were programmed as described previously using a melt velocity of 1 ft./second and a crystal deposition rate of 0.05 ft./hr. The following results were realized:

Wt. of unsweated product, lbs. _____ 36.2
Purity of unsweated product, percent _____ 97.5
Wt. of sweated product, lbs. _____ 26.4
Purity of sweated product, percent _____ 99.6

Over-all production rate:

$$\dfrac{1.4 \text{ lb. product}}{\text{hr.} \times \text{ft.}^2 \text{ tube surface}}$$

Yield:

$$0.73 \dfrac{\text{lb. product}}{\text{lb. crystals}}$$

The crystal layer which formed on the heat transfer surface was ice-like and smooth with no observed dendritic structure and thus had little entrapped melt.

*Example 3*

A commercial "Sweat Pan" was used for the following fractional crystallization:

Feed composition: 85.0% 3,4-dichloronitrobenzene; 15.0% 2,3-dichloronitrobenzene.

The coolant cycle only was programmed. The melt was stagnant. The following results were realized:

Wt. of unsweated product, lbs. _____ 15,580
Purity of unsweated product, percent _____ 92.5
Wt. of sweated product, lbs. _____ 26,380
Purity of sweated product, percent _____ 99.6

Over-all production rate:

$$\dfrac{0.09 \text{ lb. product}}{\text{hr.} \times \text{ft.}^2 \text{ surface}}$$

Yield:

$$0.51 \dfrac{\text{lb. product}}{\text{lb. crystals}}$$

The crystal structure formed was dendritic and thereby much melt was entrapped in the crystal mass.

In general, because of dendritic crystal structure formation, use of high purity feed stock (>90%) in a sweat pan has resulted in a much extended sweating period and a lower product/crystal ratio. Therefore, it is not practical to stage sweat pans.

It is to be noted that a direct comparison can be made of this example with those of Examples 1 and 2. Examples 1 and 2 considered in series average an over-all production rate of 0.8 lb. product/hr.×ft.² surface for approximately the same degree of purification. This represents a 9-fold increase in productivity afforded by this invention.

Example 4

The equipment of Example 1 was used for the following fractional crystallization:

Feed composition: 93% α-nitronaphthalene; 7% β-nitronaphthalene.

The melt and coolant temperature cycles were programmed as heretofore described using a melt velocity of 1.5 ft./second and a crystal deposition rate of 0.046 ft./hr. The following results were realized:

| | |
|---|---|
| Wt. of unsweated product, lbs. | 38.8 |
| Purity of unsweated product, percent | 98.0 |
| Wt. of sweated product, lbs. | 32.1 |
| Purity of sweated product, percent | 99.2 |

Over-all production rate:

$$\frac{1.4 \text{ lb. product}}{\text{hr.} \times \text{ft.}^2 \text{ tube surface}}$$

Yield:

$$0.83 \frac{\text{lb. product}}{\text{lb. crystals}}$$

The crystal layer which formed on the heat transfer surface was ice-like and smooth.

Example 5

The equipment of Example 1 was used for the following fractional crystallization:

Feed composition: 71% p-nitrotoluene; 20% o-nitrotoluene; 9% m-nitrotoluene.

The melt and coolant temperature cycles were programmed as heretofore described for a melt velocity of 1 ft./second and a crystal deposition rate of 0.049 ft./hr. The following results were realized:

| | |
|---|---|
| Wt. of unsweated product, lbs. | 23.3 |
| Purity of unsweated product, percent | 90.0 |
| Wt. of sweated product, lbs. | 21.1 |
| Purity of sweated product, percent | 93.0 |

Over-all production rate:

$$\frac{1.9 \text{ lbs. product}}{\text{hr.} \times \text{ft.}^2 \text{ tube surface}}$$

Yield:

$$0.91 \frac{\text{lb. product}}{\text{lb. crystals}}$$

The crystal layer which formed on the heat transfer surface was ice-like and smooth.

Example 6

A series of runs were made using the equipment of Example 1 to show the effect of melt velocity on over-all production rate and yield:

Feed composition: 85.0% 3,4-dichloronitrobenzene; 15.0% 2,3-dichloronitrobenzene.

The melt and coolant temperature cycles were programmed in a manner similar to that heretofore described for the melt velocities indicated:

| | | |
|---|---|---|
| Avg. melt velocity | 1.0 ft./second | 1.6 ft./second. |
| Avg. Over-all production rate. | 1.7 lbs./hr.×ft.² | 3.4 lbs./hr.×ft.². |
| Avg. Yield | $0.88 \frac{\text{lb. product}}{\text{lb. crystals}}$ | $0.94 \frac{\text{lb. product}}{\text{lb. crystals}}$ |
| No. runs averaged | 4 | 3. |

Thus, it is demonstrated that increased melt velocity materially increases the over-all production rate and yield.

It is to be understood that the preceding examples are representative and that said examples may be varied within the scope of the total specification, as understood by one skilled in the art, to produce essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A crystallization process for depositing a dense, glass-like crystal layer on a cooling surface which comprises contacting a liquid mixture having at least one crystallizable component with said cooling surface and circulating said mixture over said cooling surface at a constant rate while simultaneously controlling the liquid melt temperature and coolant temperature so as to maintain a controlled constant concentration gradient at the mother liquor-crystal interface.

2. A crystallization process for depositing a dense, glass-like crystal layer on a cooling surface which comprises contacting a liquid mixture having at least one crystallizable component with said cooling surface and circulating said mixture over said cooling surface at a constant rate while maintaining a constant concentration gradient at the mother liquor-crystal interface by controlling the temperatures of the melt and coolant according to the relationship $$hA(T_m - T_i) + A\lambda\rho\frac{dx}{d\theta} = \frac{A'k}{x}(T_i - T_w)$$

where $$\frac{dx}{d\theta} = \frac{K}{\rho}(C^* - C_i), \text{ and}$$

wherein $h$ is the interfacial film heat transfer coefficient, $A$ is the interfacial area, $A'$ is the mean area for heat transfer through the crystal layer, $\lambda$ is the heat of fusion, $\rho$ is the crystal density, $k$ is the crystal thermal conductivity, $K$ is the crystal growth rate constant, $T_m$ is the melt temperature, $T_w$ is the coolant temperature, $T_i$ is the crystal-melt interface temperature, $C^*$ is the melt composition, $C_i$ is the interfacial composition, $x$ is the crystal thickness and $\theta$ is the time period over which the crystallization takes place.

3. The crystallization process of claim 1 wherein the cooling surface consists of the outer walls of at least one hollow tube.

4. The crystallization process of claim 1 wherein the cooling surface consists of the outer walls of at least one hollow tube having multiple fins attached to the outside surface, said fins positioned in planes coinciding essentially with the radial planes of the tube running parallel to the longitudinal axis of the tube, and wherein said liquid mixture circulates so as to flow in a direction parallel to the longitudinal axis of said tube.

5. A crystallization process for depositing a dense, glass-like crystal layer on a cooling surface which comprises contacting a liquid mixture having at least one crystallizable component with said cooling surface and circulating said mixture over said cooling surface at a constant rate while simultaneously controlling the liquid melt temperature and coolant temperature so as to maintain a temperature at the mother liquor-crystal interface which is above the nucleation temperature and below the freezing point of said liquid mixture.

6. The process of claim 1 wherein the melt velocity over the cooling surface is at least one foot per second.

7. A surface crystallization process for separating 3,4-dichloronitrobenzene from its admixture with 2,3-dichloronitrobenzene which comprises circulating said mixture over a cooling surface at a constant rate of one foot per second while simultaneously controlling the liquid melt temperature and coolant temperature so as to maintain a controlled constant concentration gradient at the mother liquor-crystal interface.

References Cited by the Examiner

UNITED STATES PATENTS

| | | | |
|---|---|---|---|
| 1,836,212 | 12/1931 | Wieland et al. | 260—645 |
| 2,691,009 | 10/1954 | Bethea | 260—707 X |
| 2,890,239 | 6/1959 | Quigg | 260—645 X |
| 3,093,649 | 6/1963 | Ratje et al. | 260—645 X |

References Cited by the Applicant

UNITED STATES PATENTS

| | | |
|---|---|---|
| 2,200,424 | 5/1940 | Kubaugh. |
| 2,288,667 | 7/1942 | Allen et al. |
| 2,471,899 | 5/1949 | Regner. |
| 2,800,000 | 7/1957 | Berger. |

L. DEWAYNE RUTLEDGE, *Primary Examiner.*

CARL D. QUARFORTH, *Examiner.*

L. A. SEBASTIAN, *Assistant Examiner.*